United States Patent
Hattori et al.

(10) Patent No.: US 9,803,061 B2
(45) Date of Patent: Oct. 31, 2017

(54) CARBON FIBER-REINFORCED THERMOPLASTIC RESIN COMPOSITION, AND PELLETS AND MOLDED ARTICLE THEREOF

(71) Applicant: Toray Industries, Inc., Tokyo (JP)

(72) Inventors: Kimihiko Hattori, Nagoya (JP); Akiyoshi Tamai, Nagoya (JP); Kenichi Utazaki, Nagoya (JP)

(73) Assignee: Toray Industries, Inc. (JP)

(*) Notice: Subject to any disclaimer, the term of this patent is extended or adjusted under 35 U.S.C. 154(b) by 598 days.

(21) Appl. No.: 14/355,913

(22) PCT Filed: Nov. 19, 2012

(86) PCT No.: PCT/JP2012/079898
§ 371 (c)(1),
(2) Date: May 2, 2014

(87) PCT Pub. No.: WO2013/080820
PCT Pub. Date: Jun. 6, 2013

(65) Prior Publication Data
US 2014/0296414 A1    Oct. 2, 2014

(30) Foreign Application Priority Data

Nov. 29, 2011 (JP) ................... 2011-259853
Dec. 28, 2011 (JP) ................... 2011-287784

(51) Int. Cl.
| | |
|---|---|
| C08K 3/04 | (2006.01) |
| C08K 3/22 | (2006.01) |
| B29B 7/90 | (2006.01) |
| C08K 7/06 | (2006.01) |
| C08J 5/04 | (2006.01) |
| B29C 70/12 | (2006.01) |
| B29B 9/14 | (2006.01) |
| B29B 9/06 | (2006.01) |
| C08L 77/02 | (2006.01) |
| C08L 77/06 | (2006.01) |
| B29B 7/38 | (2006.01) |

(52) U.S. Cl.
CPC ............... *C08K 3/04* (2013.01); *B29B 7/90* (2013.01); *B29B 9/06* (2013.01); *B29B 9/14* (2013.01); *B29C 70/12* (2013.01); *C08J 5/042* (2013.01); *C08K 3/22* (2013.01); *C08K 7/06* (2013.01); *B29B 7/38* (2013.01); *C08J 2377/00* (2013.01); *C08K 2003/2241* (2013.01); *C08L 77/02* (2013.01); *C08L 77/06* (2013.01)

(58) Field of Classification Search
CPC .... C08K 3/04; C08K 2003/2237; C08J 5/042; B29B 7/90
See application file for complete search history.

(56) References Cited

U.S. PATENT DOCUMENTS

| | | | |
|---|---|---|---|
| 4,442,254 A | 4/1984 | Aratani | |
| 2004/0034152 A1* | 2/2004 | Oka | ............... C08K 3/22 524/497 |

FOREIGN PATENT DOCUMENTS

| | | |
|---|---|---|
| JP | 62-9541 B2 | 2/1987 |
| JP | 62-244606 A | 10/1987 |
| JP | 02-129265 A | 5/1990 |
| JP | 05-261729 A | 10/1993 |
| JP | 6-172515 | 6/1994 |
| JP | 2000-109671 A | 4/2000 |
| JP | 2003-238818 A | 8/2003 |
| JP | 2006-001964 A | 1/2006 |
| JP | 2006-001965 A | 1/2006 |
| JP | 2008-074992 A | 4/2008 |
| JP | 2009-242616 A | 10/2009 |
| JP | 2011-057730 A | 3/2011 |

* cited by examiner

*Primary Examiner* — Ling Choi
*Assistant Examiner* — Thuy-Ai N Nguyen
(74) *Attorney, Agent, or Firm* — DLA Piper LLP (US)

(57) ABSTRACT

A carbon fiber-reinforced thermoplastic resin composition includes a thermoplastic resin (A), a carbon fiber (B), and a titanium compound (C), an amount of the thermoplastic resin (A) being 10 to 65% by weight, an amount of the carbon fiber (B) being 35 to 90% by weight, based on 100% by weight of the total amount of the thermoplastic resin (A) and the carbon fiber (B), and an amount of the titanium compound (C) being 0.01 to 5 parts by weight, based on 100 parts by weight of the total amount of the thermoplastic resin (A) and the carbon fiber (B).

16 Claims, No Drawings

CARBON FIBER-REINFORCED THERMOPLASTIC RESIN COMPOSITION, AND PELLETS AND MOLDED ARTICLE THEREOF

TECHNICAL FIELD

This disclosure relates a carbon fiber-reinforced thermoplastic resin composition having excellent mechanical properties, surface appearance, and the like, particularly, high flexural modulus, high strength, and excellent appearance/designability, and a pellet and molded article thereof.

BACKGROUND

Blending a fibrous filler such as a glass fiber and a carbon fiber is commonly known to improve mechanical properties of thermoplastic resins. In general, a method is used in which a thermoplastic resin and chopped strands (staple fibers) of a fibrous filler are melt-kneaded in an extruder to produce a fiber-reinforced resin composition.

In recent years, however, there has been an increased demand for higher-performance plastics and rigidity comparable to that of metals. To achieve rigidity comparable to that of metals, it is necessary to fill a fibrous filler in large amounts and maintain a long fiber length, but methods in which a common fibrous filler is used for melt-kneading in an extruder had many problems. For example, fibers are broken by shearing during melt-kneading; resin is degraded by shear heating due to the fibrous filler; and when carbon fibers are blended in large amounts, the internal pressure of a die of an extruder increases, and fluffing of strands occurs, resulting in unstable production. Methods in which a thermoplastic resin and a fibrous filler are melt-kneaded in an extruder provided limited increase in performance.

In response, resin compositions have been proposed in which a nylon resin is blended with a specific carbon fiber to achieve weight saving and higher rigidity (JP 2006-1964 A and JP 2006-1965 A).

JP 2003-238818 A proposes a carbon fiber-reinforced thermoplastic resin composition comprising a thermoplastic resin, carbon fiber, and titanium oxide, and discloses a long fiber-containing thermoplastic resin composition in which the carbon fiber is covered with a thermoplastic resin preliminarily compounded with titanium oxide. According to that method, the fiber length can be kept long, and excellent properties can be exhibited.

Further, JP 2000-109671 A proposes a resin composition comprising a specific polycarbonate resin and a fibrous filler, and discloses a polycarbonate resin composition containing carbon fibers in an amount of about 30%.

For the resin compositions disclosed in JP '964 and JP '965, weight saving and higher rigidity are achieved through the use of a carbon fiber, but there is a problem with appearance/designability in that undulating irregularities tend to occur, resulting in significantly deteriorated appearance. Further, a method in which a carbon fiber is blended in an amount exceeding 40% by weight is not disclosed.

For the resin composition disclosed in JP '818, the amount of a carbon fiber is limited, and the amount exceeding 30% by weight is not described.

The resin composition disclosed in JP '671 provides insufficient properties and insufficient productivity.

As described above, for thermoplastic resin compositions, various approaches have been attempted in raw materials such as polymer raw material and fibrous filler. However, there is no known technique that achieves high rigidity and provides a resin composition having excellent appearance/designability.

It could therefore be helpful to provide a carbon fiber-reinforced thermoplastic resin composition having excellent mechanical properties and appearance/designability, and a molded article produced by molding the same.

SUMMARY

We thus provide:

A carbon fiber-reinforced thermoplastic resin composition comprising a thermoplastic resin (A), a carbon fiber (B), and a titanium compound (C), the amount of the thermoplastic resin (A) being 10 to 65% by weight, the amount of the carbon fiber (B) being 35 to 90% by weight, based on 100% by weight of the total amount of the thermoplastic resin (A) and the carbon fiber (B), and the amount of the titanium compound (C) being 0.01 to 5 parts by weight, based on 100 parts by weight of the total amount of the thermoplastic resin (A) and the carbon fiber (B).

A pellet produced by molding the carbon fiber-reinforced thermoplastic resin composition described above, wherein the carbon fiber in the pellet has a weight average fiber length of 0.01 to 2 mm.

A molded article produced by molding the pellet described above.

The titanium compound (C) is preferably titanium oxide.

The amount of the titanium compound (C) is preferably 0.1 to 1.5% by weight of the amount of the carbon fiber (B).

The thermoplastic resin (A) is preferably at least one selected from a polyamide resin, a polycarbonate resin, and a polyester resin.

The thermoplastic resin (A) is preferably a polyamide resin.

The polyamide resin preferably has a melting point (Tm) of 250 to 350° C., as determined by thermal analysis using a differential scanning calorimeter (DSC).

The polyamide resin preferably has a difference between a melting point (Tm) and a crystallization temperature at descending temperature (Tc) of 0° C. to 50° C., wherein Tm and Tc are determined by thermal analysis using a differential scanning calorimeter (DSC).

The polyamide resin is preferably at least one selected from the group consisting of polyamide 6, polyamide 66, polyamide MXD6, polyamide 9T, polyamide 10T, and copolyamides thereof.

The polyamide resin preferably comprises an aromatic group-containing crystalline polyamide resin (a) and an amorphous polyamide resin (b), the amount of the aromatic group-containing crystalline polyamide resin (a) being 1 to 99% by weight, the amount of the amorphous polyamide resin (b) being 99 to 1% by weight, based on 100% by weight of the total amount of (a) and (b).

The aromatic group-containing crystalline polyamide resin (a) preferably has a melting point (Tm) of 250 to 350° C., as determined by thermal analysis using a differential scanning calorimeter (DSC).

The aromatic group-containing crystalline polyamide resin (a) preferably has a difference between a melting point (Tm) and a crystallization temperature at descending temperature (Tc) of 0° C. to 50° C., wherein Tm and Tc are determined by thermal analysis using a differential scanning calorimeter (DSC).

The aromatic group-containing crystalline polyamide resin (a) is preferably at least one selected from the group consisting of polyamide 9T, polyamide 10T, polyamide 6T/66, polyamide 12T, 10T/1012, and polyamide 6T.

The carbon fiber-reinforced thermoplastic resin composition preferably further comprises 0.1 to 20 parts by weight of a granular filler (D), based on 100 parts by weight of the total of the thermoplastic resin (A) and the carbon fiber (B).

In the molded article, the carbon fiber in the molded article preferably has a weight average fiber length of 0.01 to 0.5 mm.

The molded article preferably has a flexural modulus of 20 GPa or more, and an arithmetic mean height ($W_a$) value of an undulating curve of 3.0 µm or less.

We provide a carbon fiber-reinforced thermoplastic resin composition having not only a very high flexural modulus and strength, but also excellent appearance/designability, and a molded article thereof. Therefore, the carbon fiber-reinforced thermoplastic resin composition can be suitably used in various applications requiring appearance/designability in addition to mechanical properties such as automotive parts, electric and electronic parts, building components, and sports equipment parts.

DETAILED DESCRIPTION

The carbon fiber-reinforced thermoplastic resin composition, and the pellet and molded article thereof will now be described in detail.

The thermoplastic resin (A) may be any resin and can be selected from those which are used conventionally as molding materials. The thermoplastic resin (A) may be an oligomer, a polymer, a copolymer, a block copolymer, a random copolymer, an alternating copolymer, an alternating block polymer, a graft copolymer, a star block copolymer, an ionomer, a dendrimer, or any material comprising a combination including at least one of them.

Examples of suitable thermoplastic resins include polyamide resins, polycarbonate resins, polyester resins, styrene resins, polyphenylene ether resins, polyolefin resins, polyvinyl chloride resins, polyacetal resins, acrylic resins, plant-derived thermoplastic resins represented by polylactic acid, polyarylene sulfide, polyaramid, polyamide-imide, polyarylate, polyarylsulfone, polyethersulfone, polysulfone, polyimide, polyetherimide, polytetrafluoroethylene, polyether ketone, polyether ether ketone, polyether ketone ketone, polybenzooxazole, polyoxadiazole, polybenzothiazinophenothiazine, polybenzothiazole, polypyrazinoquinoxaline, polypyromellitimide, polyquinoxaline, polybenzimidazole, polyoxindole, polyoxoisoindoline, polydioxoisoindoline, polytriazine, polypyridazine, polypiperazine, polypyridine, polypiperidine, polytriazole, polypyrazole, polycarborane, polyoxabicyclononane, polydibenzofuran, polyphthalide, polyacetal, polyanhydride, polyvinyl ether, polyvinyl thioether, polyvinyl alcohol, polyvinyl ketone, polysiloxane, polybutadiene, and polyisoprene. In terms of excellent mechanical properties, polyamide resins, polycarbonate resins, polyester resins, and styrene resins are preferred. Polyamide resins, polycarbonate resins, and polyester resins are more preferred, and polyamide resins are still more preferred.

The polyamide resin may be any resin as long as it has an amide bond in a repeating structure of the polymer. Thermoplastic polyamide resins are preferred as the polyamide resin, and examples thereof include homopolyamides, copolyamides and mixtures thereof produced through polymerization of a monomer such as lactams, an amino carboxylic acid and/or diamine with dicarboxylic acid.

Preferred lactams are $C_6$-$C_{12}$ lactams, and examples thereof include ε-caprolactam, enantholactam, undecanelactam, dodecanelactam, α-pyrrolidone, and α-piperidone. Preferred amino carboxylic acids are $C_6$-$C_{12}$ amino carboxylic acids, and examples thereof include 6-aminocaproic acid, 7-aminoheptanoic acid, 9-aminononanoic acid, 11-aminoundecanoic acid, 12-aminododecanoic acid, and 13-aminotridecanoic acid. Examples of the diamine include aliphatic diamines such as tetramethylenediamine, hexamethylenediamine, octamethylenediamine, nonamethylenediamine, decamethylenediamine, undecamethylenediamine, and dodecamethylenediamine; alicyclic diamines such as 1,3-bisaminomethylcyclohexane and 1,4-bisaminomethylcyclohexane; and aromatic diamines such as m-phenylenediamine, p-phenylenediamine, m-xylylenediamine, and p-xylylenediamine. Examples of the dicarboxylic acid include aliphatic dicarboxylic acids such as oxalic acid, malonic acid, succinic acid, glutaric acid, adipic acid, pimelic acid, suberic acid, azelaic acid, sebacic acid, dodecanedioic acid, 1,1,3-tridecanedioic acid, and 1,3-cyclohexanedicarboxylic acid; and aromatic dicarboxylic acids or dicarboxylic acids having a cyclic structure such as phthalic acid, terephthalic acid, isophthalic acid, naphthalene dicarboxylic acid, and dimer acid.

Specific examples include polycaproamide (nylon 6), polyhexamethylene adipamide (nylon 66), polytetramethylene adipamide (nylon 46), polyhexamethylene sebacamide (nylon 610), polyhexamethylene dodecamide (nylon 612), polyundecamethylene adipamide (nylon 116), polybis(4-aminocyclohexyl)methane dodecamide (nylon PACM12), polybis(3-methyl-4-aminocyclohexyl)methane dodecamide (nylon dimethyl PACM12), polynonamethylene terephthalamide (nylon 9T), polydecamethylene terephthalamide (nylon 10T), polyundecamethylene terephthalamide (nylon 11T), polyundecamethylene hexahydroterephthalamide (nylon 11T(H)), polyundecamide (nylon 11), polydodecamide (nylon 12), polytrimethylhexamethylene terephthalamide (nylon TMDT), polyhexamethylene terephthalamide (nylon 6T), polyhexamethylene isophthalamide (nylon 6I), polymetaxylylene adipamide (nylon MXD6), and copolymers and mixtures thereof. Among them, from the standpoint of moldability and surface appearance, nylon 6, nylon 66, nylon MXD6, nylon 9T, nylon 10T, and copolyamides thereof are preferred. Nylon 9T, nylon 10T, and nylon MXD6 are more preferred, and nylon 9T is particularly preferred. Further, using these thermoplastic polyamide resins as a mixture depending on the required properties such as shock resistance and moldability is also suitable in practice.

The degree of polymerization of these polyamide resins is not critical, but they preferably have a relative viscosity of 1.5 to 7.0, particularly preferably 2.0 to 6.0, as measured at 25° C. in a 98% concentrated sulfuric acid solution with a sample concentration of 0.01 g/ml.

The polyamide resin can be produced by mixing the diamine component and dicarboxylic acid component as described above and heating the mixture in the presence of a catalyst. In this reaction, the total moles of the diamine component are preferably larger than the total moles of the dicarboxylic acid component. The total diamine component is particularly preferably 100 to 120 mol based on 100 mol of the total dicarboxylic acid component. This reaction is typically carried out under an inert gas atmosphere, and, in general, the atmosphere in a reaction vessel is replaced with inert gas such as nitrogen gas. To control the polycondensation reaction of polyamide, it is preferable to add water in advance, and a water-soluble organic solvent, for example, an alcohol such as methanol or ethanol, may be contained.

Examples of the catalyst that can be used in producing the polyamide resin include phosphoric acid, and salts and ester compounds thereof phosphorous acid, and salts and ester compounds thereof and hypophosphorous acid, and salts and ester compounds thereof. Among them, sodium phosphate, sodium phosphite, potassium hypophosphite, sodium hypophosphite, and the like are preferred. These phosphoric acid compounds can be used alone or in combination. Such a phosphorus compound is used in an amount of typically 0.01 to 5 mol, preferably 0.05 to 2 mol, per 100 mol of the dicarboxylic acid as described above.

To produce the polyamide resin, it is preferable to use a terminal-sealing agent. Benzoic acid, alkali metal salts of benzoic acid, acetic acid, and the like can be used as the terminal-sealing agent. Such a terminal-sealing agent is used in an amount ranging typically from 0.1 to 5 mol, preferably from 0.5 to 2 mol, per 100 mol of the dicarboxylic acid. By adjusting the amount of the terminal-sealing agent, the limiting viscosity [η] of the resulting polycondensate can be controlled.

For the specific reaction conditions to prepare such a polycondensate, the reaction temperature is typically 200 to 290° C., preferably 220 to 280° C., and the reaction time is typically 0.5 to 5 hours, preferably 1 to 3 hours. Further, although this reaction can be carried out either under normal pressure or pressurized conditions, it is preferable to carry out the reaction under pressurized conditions, and the reaction pressure is typically 2 to 5 MPa, preferably 2.5 to 4 MPa.

The polycondensation reaction under such conditions yields a low-order condensate having a limiting viscosity [η] of typically 0.05 to 0.6 dl/g, preferably 0.08 to 0.3 dl/g, as measured in 96.5% sulfuric acid at 25° C. with an Ubbelohde-type viscometer. The low-order polyamide condensate thus produced in an aqueous medium is separated from the reaction solution. Methods such as filtration and centrifugation can be employed for the separation of the low-order polyamide condensate from the reaction solution, but an efficient method is to flash the reaction solution containing the resulting low-order polyamide condensate through a nozzle to the atmosphere to thereby achieving solid-liquid separation.

Preferably, in the method of producing the polyamide resin, the low-order polyamide condensate obtained as described above is further subjected to postpolymerization. Postpolymerization is preferably carried out such that the low-order polyamide condensate is dried and then heated to a molten state, and polymerization is carried out while applying a shear stress to the melt. In this reaction, the dried low-order polyamide condensate is heated to a temperature at which the condensate at least melts. In general, the condensate is heated to a temperature at or higher than the melting point of the dried low-order polyamide condensate, preferably to a temperature 10 to 60° C. higher than the melting point. The shear stress can be applied to the melt by using, for example, a twin-screw extruder provided with a vent or a kneader. It is believed that, through the application of a shear stress to the melt, the dried low-order polyamide condensates in a molten state polycondenses with each other, and polycondensation reaction of the condensates proceeds.

Preferably, in the method of producing the polyamide resin, the low-order polyamide condensate obtained as described above is further subjected to solid-phase polymerization. Namely, the low-order polyamide condensate obtained as described above is solid-phase polymerized by a known and common method to prepare a polyamide having a limiting viscosity [η] 0.5 to 2.0 dl/g, as measured by the method described above.

Preferably, in the method of producing the polyamide resin, the low-order polyamide condensate obtained as described above is further subjected to melt polymerization after the solid-phase polymerization. Namely, the low-order polyamide condensate obtained as described above is solid-phase polymerized by a known and common method to prepare a polyamide precursor having a limiting viscosity [η] of 0.5 to 1.5 dl/g, and then the precursor is melt-polymerized to adjust the limiting viscosity [η] to be 0.8 to 3.0 dl/g. When the limiting viscosity is in this range, a polyamide resin with high fluidity and high toughness can be obtained.

When the polyamide resin is a crystalline thermoplastic polyamide resin, the resin can be demolded as long as it is crystallized and solidified even if the temperature is not cooled to its glass transition temperature (Tg). Therefore, productivity depends on the rate of crystallization from a molten state to a crystalline state. Crystallization of a polymer from a molten state proceeds such that crystal nucleus is formed at a supercooling temperature slightly lower than the melting point, and a crystal grows around the crystal nucleus. Thus, the crystallization rate is increased either by increasing the rate of formation of crystal nuclei or by increasing the growth rate.

The crystallization rate can be determined by thermal analysis using a differential scanning calorimeter (DSC). In a polymer that crystallizes rapidly, crystal nuclei are formed and grow at a higher temperature during the cooling process, and a crystallization exotherm is observed during the process of crystallization. The crystallization rate can be determined from a supercooling temperature difference (Tm–Tc) which is a difference between the melting point (Tm) and the peak temperature (Tc) of the crystallization exotherm.

The term "melting point (Tm)" herein means a melting endothermic peak temperature as observed while increasing the temperature from 30° C. at a rate of 20° C./min using DSC EXSTAR 6000 manufactured by Seiko Instruments Inc. The term "crystallization temperature (Tc)" means a crystallization exothermic peak temperature as observed while decreasing the temperature at a rate of 20° C./min from a state in which the thermoplastic polyamide resin is completely molten.

When a thermoplastic polyamide resin is used for the thermoplastic resin (A), the supercooling temperature difference (Tm–Tc) is preferably 70° C. or less, more preferably 60° C. or less, still more preferably 50° C. or less, and most preferably 40° C. or less. When the supercooling temperature difference is 70° C. or less, crystallization proceeds in a short time, leading to high productivity, and a molded article with little undulating irregularity can be obtained, which is preferred. Although the lower limit is not critical, the supercooling temperature difference (Tm–Tc) is preferably 10° C. or more, more preferably 15° C. or more, and still more preferably 20° C. or more. When it is less than 10° C., solidification proceeds too fast, leading to poor melt moldability, which is not preferred.

The thermoplastic polyamide resin preferably has a melting point (Tm), as determined by thermal analysis using a differential scanning calorimeter (DSC), of 250° C. or higher, more preferably 260° C. or higher. The upper limit of the melting point (Tm) as determined by thermal analysis using a differential scanning calorimeter (DSC) is preferably not higher than 350° C., more preferably not higher than 330° C., still more preferably not higher than 320° C., and most preferably not higher than 300° C. When the melting point (Tm) as determined by thermal analysis using a differential scanning calorimeter (DSC) is in this preferred range, a carbon fiber-reinforced thermoplastic resin composition is provided having high heat resistance, excellent moldability, excellent mechanical properties, and excellent surface appearance.

As additives to improve the long-term heat resistance of the thermoplastic polyamide resin, copper compounds are preferably used. In particular, monovalent copper compounds, especially, monovalent copper halide compounds are preferred, and examples of particularly suitable copper compounds include cuprous acetate and cuprous iodide. The amount of the copper compound is preferably 0.01 to 2 parts by weight, more preferably in the range of 0.015 to 1 part by weight, based on 100 parts by weight of the thermoplastic polyamide resin. When the amount of the copper compound is in this preferred range, release of metallic copper is unlikely to occur during melt molding, and coloration does not occur. An alkali halide can also be added in combination with the copper compound. Examples of the alkali halide compound that is particularly preferred include potassium iodide and sodium iodide.

When a polyamide resin is used as the thermoplastic resin (A), it is preferable to use an aromatic group-containing crystalline polyamide resin (a) and an amorphous polyamide resin (b). By using the aromatic group-containing crystalline polyamide resin (a) and the amorphous polyamide resin (b), surface appearance (undulating irregularity) is improved, and a carbon fiber-reinforced thermoplastic resin composition having not only a rigidity comparable to that of metals, but also satisfactory surface appearance and low water absorbability can be obtained.

The aromatic group-containing crystalline polyamide resin (a) is a semi-aromatic crystalline polyamide resin or a wholly aromatic crystalline polyamide resin.

Although there is no limitation on the semi-aromatic polyamide resin or wholly aromatic polyamide resin, a semi-aromatic crystalline polyamide resin (x) or (y) as described below is preferably used.

The semi-aromatic crystalline polyamide resin (x) is composed of a diamine component and a dicarboxylic acid component. The diamine component constituting the semi-aromatic crystalline polyamide resin (x) preferably comprises a linear aliphatic diamine component unit having 4 to 12 carbon atoms and/or an aliphatic diamine component unit with side chains having 4 to 12 carbon atoms.

When the amount of the diamine component is taken as 100 mol %, it is preferred that the total amount of the linear aliphatic diamine component unit having 4 to 12 carbon atoms and the aliphatic diamine component unit with side chains having 4 to 12 carbon atoms be 100 mol %. Specifically, a linear alkylene diamine component unit having 4 to 12 carbon atoms and/or an alkylene diamine component unit with pendant alkyl groups having 4 to 12 carbon atoms are used as the diamine component.

Specific examples of the linear alkylene diamine component unit having 4 to 12 carbon atoms include component units induced from 1,4-diaminobutane, 1,5-diaminopentane, 1,6-diaminohexane, 1,7-diaminoheptane, 1,8-diaminooctane, 1,9-diaminononane, 1,10-diaminodecane, 1,11-diaminoundecane, 1,12-diaminododecane, and combinations thereof. Among them, component units induced from linear alkylene diamine having 6 to 10 carbon atoms are preferred; component units induced from 1,6-diaminohexane, 1,9-diaminononane, 1,10-diaminodecane, and 1,12-diaminododecane are more preferred; and component units induced from 1,9-diaminononane and 1,10-diaminodecane are still more preferred.

Particularly preferred alkylene diamine component units with pendant alkyl groups having 4 to 12 carbon atoms are alkylene diamine component units having 6 to 10 carbon atoms, and specific examples thereof include the following. Examples of component units induced from alkylene diamine having a total of 6 carbon atoms include component units induced from 2-methyl-1,5-diaminopentane. Examples of component units induced from alkylene diamine having a total of 7 carbon atoms include component units induced from 2-methyl-1,6-diaminohexane, 3-methyl-1,6-diaminohexane, 2,2-dimethyl-1,5-diaminopentane, 2,4-dimethyl-1,5-diaminopentane, and 3,3-dimethyl-1,5-diaminopentane. Examples of component units induced from alkylene diamine having a total of 8 carbon atoms include component units induced from 2-methyl-1,7-diaminoheptane, 3-methyl-1,7-diaminoheptane, 4-methyl-1,7-diaminoheptane, 2,2-dimethyl-1,6-diaminohexane, 2,4-dimethyl-1,6-diaminohexane, 2,5-dimethyl-1,6-diaminohexane, and 3,3-dimethyl-1,6-diaminohexane. Examples of component units induced from alkylene diamine having a total of 9 carbon atoms include component units induced from 2-methyl-1,8-diaminooctane, 3-methyl-1,8-diaminooctane, 4-methyl-1,8-diaminooctane, 2,3-dimethyl-1,7-diaminoheptane, 2,4-dimethyl-1,7-diaminoheptane, 2,5-dimethyl-1,7-diaminoheptane, 2,2-dimethyl-1,7-diaminoheptane, 2,2,4-trimethyl-1,6-diaminohexane, and 2,4,4-trimethyl-1,6-diaminohexane. Examples of component units induced from alkylene diamine having a total of 10 carbon atoms include component units induced from 2-methyl-1,9-diaminononane, 3-methyl-1,9-diaminononane, 4-methyl-1,9-diaminononane, 5-methyl-1,9-diaminononane, 1,3-dimethyl-1,8-diaminooctane, 1,4-dimethyl-1,8-diaminooctane, 2,2-dimethyl-1,8-diaminooctane, 2,4-dimethyl-1,8-diaminooctane, 3,4-dimethyl-1,8-diaminooctane, 4,5-dimethyl-1,8-diaminooctane, and 2,4-diethyl-1,6-diaminohexane.

The dicarboxylic acid component constituting the semi-aromatic crystalline polyamide resin (x) preferably comprises 40 to 100 mol % of a terephthalic acid component unit, and 0 to 60 mol % of an aromatic dicarboxylic acid (except terephthalic acid) component unit and/or 0 to 60 mol % of an aliphatic dicarboxylic acid component unit having 4 to 20 carbon atoms. Examples of the aromatic dicarboxylic acid (except terephthalic acid) component unit include component units induced from isophthalic acid, 2-methylterephthalic acid, naphthalene dicarboxylic acid, and combinations thereof.

The aliphatic dicarboxylic acid component unit, although the number of carbon atoms is not critical, is desirably induced from an aliphatic dicarboxylic acid having 4 to 20 carbon atoms, preferably 4 to 12 carbon atoms. Examples of aliphatic dicarboxylic acids used to induce the aliphatic dicarboxylic acid component unit include succinic acid, adipic acid, suberic acid, azelaic acid, sebacic acid, decane dicarboxylic acid, undecane dicarboxylic acid, and dodecane dicarboxylic acid. Among them, adipic acid is particularly preferred.

The dicarboxylic acid component may contain a small amount (e.g., 10 mol % or less) of a polycarboxylic acid component unit together with the terephthalic acid component unit, the aromatic dicarboxylic acid (except terephthalic acid) component unit, and the aliphatic dicarboxylic acid component unit as described above. Specific examples of such a polycarboxylic acid component unit include component units induced from tribasic acids and polybasic acids such as trimellitic acid and pyromellitic acid.

Examples of the preferred semi-aromatic crystalline polyamide resin (x) include polynonamethylene terephthalamide (polyamide 9T), polydecamethylene terephthalamide (polyamide 10T), hexamethylene adipamide/hexamethylene terephthalamide copolyamide (polyamide 6T/66), poly(dodecamethylene terephthalamide) (polyamide 12T), decamethylene terephthalamide/decamethylene dodecanoamide copolyamide (10T/1012), and polyamide 6T. Polyamide 9T, polyamide 10T, and polyamide 6T/66 are more preferred, and polyamide 9T and polyamide 10T are still more preferred.

Examples of the semi-aromatic crystalline polyamide resin (y) include polymetaxylylene adipamide (polyamide MXD6), polymetaxylylene adipamide/polyparaxylylene adipamide (polyamide MXD6/PXD6), and polymetaxylylene adipamide/polymetaxylylene isophthalamide copolymer (polyamide MXD6/MXDI), and polyamide MXD6 is preferred.

The aromatic group-containing crystalline polyamide resin (a) preferably has a limiting viscosity of 1.5 to 7.0, particularly preferably 2.0 to 6.0, as measured in 98% concentrated sulfuric acid at 25° C.

The aromatic group-containing crystalline polyamide resin (a) is crystalline and, therefore, has a melting point. For a polyamide resin obtained by the production method described above, when an endothermic peak based on melting caused by increasing the temperature at 20° C./min using a DSC is taken as its melting point, the upper limit of the melting point is preferably not higher than 350° C., more preferably not higher than 330° C., and still more preferably not higher than 320° C. The lower limit of the melting point is preferably not lower than 200° C., more preferably not lower than 250° C., and still more preferably not lower than 260° C. When the melting point is in this preferred range, a carbon fiber-reinforced thermoplastic resin composition can be obtained having high heat resistance, excellent moldability, excellent mechanical properties, and excellent surface appearance.

The amorphous polyamide resin (b) used in the carbon fiber-reinforced thermoplastic resin composition refers to a polyamide resin having a heat of fusion of less than 4 J/g, as measured with a differential scanning calorimeter (DSC) under a nitrogen atmosphere at a temperature rise rate of 20° C./min.

Examples of the amorphous polyamide resin (b) include isophthalic acid/terephthalic acid/hexamethylenediamine polycondensate, isophthalic acid/terephthalic acid/hexamethylenediamine/bis(3-methyl-4-aminocyclohexyl)methane polycondensate, terephthalic acid/2,2,4-trimethylhexamethylenediamine/2,4,4-trimethylhexamethylenediamine polycondensate, isophthalic acid/bis(3-methyl-4-aminocyclohexyl)methane/ω-laurolactam polycondensate, isophthalic acid/2,2,4-trimethylhexamethylenediamine/2,4,4-trimethylhexamethylenediamine polycondensate, isophthalic acid/terephthalic acid/2,2,4-trimethylhexamethylenediamine/2,4,4-trimethylhexamethylenediamine polycondensate, and isophthalic acid/bis(3-methyl-4-aminocyclohexyl)methane/ω-laurolactam polycondensate. The benzene ring in the terephthalic acid component and/or isophthalic acid component constituting these polycondensates may be substituted with an alkyl group or a halogen atom. These amorphous polyamides may also be used in combination of two or more thereof. Preferred is a combination of terephthalic acid/2,2,4-trimethylhexamethylenediamine/2,4,4-trimethylhexamethylenediamine polycondensate with isophthalic acid/terephthalic acid/hexamethylenediamine/bis(3-methyl-4-aminocyclohexyl)methane polycondensate, terephthalic acid/2,2,4-trimethylhexamethylenediamine/2,4,4-trimethylhexamethylenediamine polycondensate, or isophthalic acid/terephthalic acid/hexamethylenediamine/bis(3-methyl-4-aminocyclohexyl)methane polycondensate.

The glass transition temperature of the amorphous polyamide resin (b) is not critical, but it is preferably 80° C. or higher, more preferably 100° C. or higher, and still more preferably 120° C. or higher. The upper limit of the glass transition temperature is preferably not higher than 200° C., more preferably not higher than 180° C., and still more preferably not higher than 160° C. When the glass transition temperature of the amorphous polyamide resin is in this preferred range, more excellent surface appearance can be provided. The term "glass transition temperature" refers to a glass transition temperature determined by measurement using a differential scanning calorimeter (DSC) under conditions of a nitrogen atmosphere at 20° C./min.

For the amount of the amorphous polyamide resin (b), it is preferred that the amount of the aromatic group-containing crystalline polyamide resin (a) be 1 to 99% by weight, and the amount of the amorphous polyamide resin (b) 99 to 1% by weight, based on 100% by weight of the total amount of the aromatic group-containing crystalline polyamide resin (a) and the amorphous polyamide resin (b). The amount of the aromatic group-containing crystalline polyamide resin (a) is more preferably 50% by weight or more, still more preferably 60% by weight or more. The upper limit of the amount of the aromatic group-containing crystalline polyamide resin (a) is more preferably not more than 95% by weight, still more preferably not more than 80% by weight. When the amount of the aromatic group-containing crystalline polyamide resin (a) not less than 1% by weight, higher rigidity and lower water absorbability are provided. When it is not more than 99% by weight, surface appearance is sufficiently improved.

The aromatic group-containing crystalline polyamide resin (a) has a melting point (Tm) and a crystallization temperature (Tc) as determined by thermal analysis using a differential scanning calorimeter (DSC), the difference between which, i.e., Tm–Tc, is preferably 50° C. or less, more preferably 40° C. or less. It is preferably 0° C. or more, more preferably 10° C. or more. When Tm–Tc is in this preferred range, crystallization proceeds in a short time, leading to high productivity, and a molded article with little undulating irregularity can be obtained.

The term "melting point (Tm)" herein means a melting endothermic peak temperature as observed while increasing the temperature from 30° C. at a rate of 20° C./min using EXSTAR DSC6000 manufactured by Seiko Instruments Inc. The term "crystallization temperature (Tc)" means a crystallization exothermic peak temperature as observed while decreasing the temperature using the EXSTAR DSC6000 at a rate of 20° C./min from a state in which the thermoplastic polyamide resin is completely molten.

Examples of polycarbonate resins include 4,4'-dihydroxydiarylalkane polycarbonate. Specific examples include bisphenol A polycarbonate (PC), modified bisphenol A polycarbonate, and flame-retarded bisphenol A polycarbonate.

The molecular weight of the polycarbonate resin is preferably 10,000 to 50,000, more preferably 15,000 to 40,000, and most preferably 15,000 to 30,000, in terms of viscosity average molecular weight determined from a solution viscosity measured at a temperature of 25° C. using methylene chloride as a solvent.

Examples of polyester resins include polycondensates of an aromatic dicarboxylic acid with an alkylene glycol such as ethylene glycol, propylene glycol, or butylene glycol. Specific examples include polyethylene terephthalate (PET), polypropylene terephthalate (PPT), and polybutylene terephthalate (PBT).

Examples of styrene resins include homopolymers of styrene, α-methylstyrene, and the like, copolymers thereof, and copolymers of such styrenes with unsaturated monomers copolymerizable therewith. Specific examples include general-purpose polystyrene (GPPS), high-impact polystyrene (HIPS), heat-resistance polystyrene (e.g., α-methylstyrene polymer or copolymer), acrylonitrile-butadiene-styrene copolymer (ABS), acrylonitrile-butadiene-styrene-α-methylstyrene copolymer (α-methylstyrene heat-resistant ABS), acrylonitrile-butadiene-styrene-phenylmaleimide copolymer (phenylmaleimide heat-resistant ABS), acrylonitrile-styrene copolymer (AS), acrylonitrile-chlorinated polystyrene-styrene copolymer (ACS), acrylonitrile-ethylene propylene rubber-styrene copolymer (AES), acryl rubber-acrylonitrile-styrene copolymer (AAS), and syndiotactic polystyrene (SPS). The styrene resin may be a polymer blend.

Examples of polyphenylene ether resins (PPE) include homopolymers of poly(2,6-dimethyl-1,4-phenylene) ether, poly(2-methyl-6-ethyl-1,4-phenylene) ether, and the like. Such homopolymers may be modified with a styrene resin.

Representative examples of polyolefin resins include homopolymers of α-olefins such as ethylene, propylene, butene-1,3-methylbutene-1,3-methylpentene-1, and 4-methylpentene-1, copolymers thereof, and copolymers of such α-olefins with other copolymerizable unsaturated monomers. Representative examples include polyethylenes such as high-density polyethylene, medium-density polyethylene, low-density polyethylene, linear low-density polyethylene, ultra-high molecular weight polyethylene, and metallocene ethylene-α-olefin copolymers such as ethylene-vinyl acetate copolymer, ethylene-ethyl acrylate copolymer, and ethylene-octene-1 copolymer; polypropylenes such as atactic polypropylene, syndiotactic polypropylene, isotactic polypropylene, propylene-ethylene block copolymer, and propylene-ethylene random copolymer; and polymethylpentene-1.

Examples of polyvinyl chloride resins include vinyl chloride homopolymer and copolymers of vinyl chloride with copolymerizable unsaturated monomers. Specific examples include vinyl chloride-acrylate copolymer, vinyl chloride-methacrylate copolymer, vinyl chloride-ethylene copolymer, vinyl chloride-propylene copolymer, vinyl chloride-vinyl acetate copolymer, and vinyl chloride-vinylidene chloride copolymer. These polyvinyl chloride resins may be chlorinated to increase their chlorine content.

Examples of polyacetal resins (POM) include homopolymer polyoxymethylene, and formaldehyde-ethylene oxide copolymer obtained from trioxane and ethylene oxide.

Examples of acrylic resins include methacrylic acid ester homopolymer, acrylic acid ester homopolymer, copolymers thereof, and copolymers of such esters with other copolymerizable unsaturated monomers. Examples of methacrylic acid ester monomers and acrylic acid ester monomers include methyl esters, ethyl esters, n-propyl esters, isopropyl esters, and butyl esters of methacrylic acid and acrylic acid. Representative examples include methacryl resin (PMMA).

These thermoplastic resins may be used alone or in combination of two or more thereof.

The carbon fiber (B) used in the carbon fiber-reinforced thermoplastic resin composition may be any carbon fiber, and known various carbon fibers, for example, carbonaceous fibers and graphite fibers produced using polyacrylonitrile, pitch, rayon, lignin, hydrocarbon gas, and the like can be used. Further, these fibers may be metal-coated. In particular, PAN-based carbon fibers, which can provide improved mechanical properties, can be preferably used. The carbon fiber (B) is typically in the form of chopped strands, roving strands, milled fibers, and the like, and has a diameter of 15 μm or less, preferably 5 to 10 μm.

The carbon fiber (B) may be in any form, and is used in the form a bundle of thousands to several hundreds of thousands of carbon fibers or in a milled form. For the carbon fiber bundle, the roving method in which continuous fibers are directly used, or a method using chopped strands cut to a given length can be used.

As the carbon fiber (B), chopped strands are preferably used, and the number of filaments of a carbon fiber strand, which is a precursor of a chopped carbon fiber, is preferably 1,000 to 150,000. When the number of filaments of the carbon fiber strands is in this preferred range, production cost can be reduced, and stability in manufacturing processes can be ensured.

The strand modulus of the carbon fiber (B) is not critical, and it is preferably 150 GPa or more, more preferably 220 GPa or more, and still more preferably 250 GPa or more. The upper limit of the strand modulus is preferably not more than 1000 GPa, more preferably not more than 700 GPa, and still more preferably not more than 500 GPa. When the strand modulus is in this preferred range, the mechanical properties of the carbon fiber-reinforced thermoplastic resin composition are fully exerted, which leads to reduction in production cost.

The strand strength of the carbon fiber (B) is not critical, and is preferably 1 GPa or more, more preferably 4 GPa or more, and still more preferably 5 GPa or more. The upper limit of the strand strength is preferably not more than 20 GPa, more preferably not more than 15 GPa, and still more preferably not more than 10 GPa. When the strand strength is in this preferred range, the strength of the resulting carbon fiber-reinforced thermoplastic resin composition is exerted, which leads to reduction in production cost.

The terms "strand modulus" and "strand strength" as used herein respectively refer to an elastic modulus and a strength of a strand prepared by impregnating a continuous fiber bundle comprising 3,000 to 90,000 carbon fiber filaments with epoxy resin, followed by curing. They are determined by subjecting a strand test piece to a tensile test in accordance with JIS R 7601.

The carbon fiber (B) may be subjected to surface oxidation treatment to improve the adhesion between the thermoplastic resin (A) and the carbon fiber (B). The treatment may be a surface oxidation treatment by electrification or an oxidation treatment in an atmosphere of oxidizing gas such as ozone.

Further, a coupling agent, a sizing agent, and the like may be applied to the surface of the carbon fiber (B) to improve resin wettability and handleability. Examples of coupling agents include amino-functional, epoxy-functional, chlorfunctional, mercapto-functional, and cationic silane coupling agents, and amino-functional silane coupling agents can be suitably used. Examples of sizing agents include sizing agents containing at least one selected from maleic anhydride compounds, urethane compounds, acrylic compounds, epoxy compounds, phenolic compounds, and derivatives of these compounds, and sizing agents containing a urethane compound or an epoxy compound can be suitably used. The amount of the sizing agent in the carbon fiber (B) is preferably 0.1 to 10.0% by weight, more preferably 0.3 to 8.0% by weight, and particularly preferably 0.5 to 6.0% by weight.

Examples of methods that can be used to apply a sizing agent to strands of the carbon fiber (B) and then cut the strands into chopped carbon fibers include the method employed for glass fiber chopped strands in JP 62-9541 B and methods, for example, in JP 62-244606 A and JP 05-261729 A.

The carbon fiber (B) is contained such that the amount of the thermoplastic resin (A) is 10 to 65% by weight, and the amount of the carbon fiber (B) is 35 to 90% by weight, based on 100% by weight of the total amount of the thermoplastic resin (A) and the carbon fiber (B). The amount of the carbon fiber (B) is preferably 40% by weight or more, more preferably 45% by weight or more. The upper limit of the amount of the carbon fiber (B) is preferably not more than 70% by weight, more preferably not more than 65% by weight. When the amount of the carbon fiber (B) is in this preferred range, sufficient mechanical properties and stable productivity can be simultaneously achieved.

The titanium compound (C) is a compound containing a titanium atom, and examples thereof include inorganic titanium compounds such as titanium oxide and titanium hydroxide, and organic titanium compounds such as titanium oxalate and titanium alkoxides.

Examples of inorganic titanium compounds include titanium oxide, titanium hydroxide, potassium titanate, and titanium chloride, and examples of organic titanium compounds include titanium oxalate; titanium alcoholates such as tetramethyl titanate, tetraisopropyl titanate, and tetrabutyl titanate; and titanium phenolates such as tetraphenyl titanate.

From the standpoint of improving the surface appearance of the thermoplastic resin composition, it is preferable to use inorganic titanium compounds, more preferably titanium oxide and titanium hydroxide, and still more preferably titanium oxide.

The crystal form of titanium oxide is not critical and, for example, the anatase form, the rutile form, and the brookite form can be used. The anatase form and the rutile form are preferably used because they are generally industrialized, and the rutile form is most preferably used.

The titanium oxide may be produced by any method such as a sulfate process and a chloride process, and the titanium oxide produced by the sulfate process is preferably used.

The average particle size of the titanium oxide is not critical, and is preferably 0.10 to 0.40 μm. When the average particle size of the titanium oxide is in this preferred range, the resulting carbon fiber-reinforced thermoplastic resin composition has a satisfactory surface appearance, and a molded article thereof will not have reduced physical properties or a reduced masking effect. The average particle size is determined by the number average of the major axis of particles observed under a microscope at 50- to 100-fold magnification.

The titanium oxide is generally subjected to one or more surface treatments to improve dispersibility and the like. For the surface treatment, hydrous oxides and oxides such as alumina, silica, and zinc oxide, silane coupling agents, titanate coupling agents, silicone oil, and the like are generally and preferably used. If the surface treatment is not performed, for example, decrease in resin molecular weight may occur during the melting of the resin composition at a high temperature. On the other hand, if the amount of the surface treatment agent is too large, water of crystallization may affect the original function. Thus, it is preferable to appropriately select the surface treatment method in consideration of the type of resin used, processing temperature, and the like.

The amount of the titanium compound (C) is 0.01 to 5 parts by weight based on 100 parts by weight of the total amount of the thermoplastic resin (A) and the carbon fiber (B). The amount of the titanium compound (C) is preferably 0.05 parts by weight or more, more preferably 0.1 parts by weight or more. It is preferably 2 parts by weight or less, more preferably 1 part by weight or less. When the amount of the titanium compound is in this preferred range, a resin composition can be obtained which presents an excellent appearance and fluidity and provides a molded article with excellent properties, in particular, impact strength.

The amount of the titanium compound (C) in the carbon fiber-reinforced thermoplastic resin composition is preferably 0.1 to 1.5% by weight of the amount of the carbon fiber (B) to achieve an excellent balance between the mechanical properties and appearance of the carbon fiber-reinforced thermoplastic resin composition.

The carbon fiber-reinforced thermoplastic resin composition may further comprise a granular filler (D).

The granular filler (D) is a non-fibrous filler in the form of a plate, powder, a sphere, or the like. Specific examples thereof include non-fibrous fillers (e.g., silicates such as talc, zeolite, sericite, mica, kaolin, clay, pyrophyllite, and bentonite; metal compounds such as magnesium oxide, alumina, zirconium oxide, and iron oxide; carbonates such as calcium carbonate, magnesium carbonate, and dolomite; sulfates such as calcium sulfate and barium sulfate; glass beads; ceramic beads; boron nitride; calcium phosphate; hydroxides such as calcium hydroxide, magnesium hydroxide, and aluminum hydroxide; glass flake; glass powder; glass balloon; carbon black; silica; and graphite) and layered silicates (represented by smectite clay minerals such as montmorillonite, beidellite, nontronite, saponite, hectorite, and sauconite; various clay minerals such as vermiculite, halloysite, kanemite, kenyaite, zirconium phosphate, and titanium phosphate; and swellable micas such as Li-fluortaeniolite, Na-fluor-taeniolite, Na-tetrasilicic fluormica, and Li-tetrasilicic fluormica). The layered silicate may be a layered silicate in which exchangeable cations that exists between layers are exchanged for organic onium ions, and examples of the organic onium ion include ammonium ion, phosphonium ion, and sulfonium ion. The non-fibrous fillers listed above can also be used in combination of two or more thereof. Further, these non-fibrous fillers are preferably treated with a silane coupling agent, titanate coupling agent, or any other surface treatment agent. In particular, they are preferably treated with an epoxy silane coupling agent or an amino silane coupling agent because excellent mechanical properties can be provided.

Among these granular fillers (D), plate-like fillers such as mica, talc, kaolin, clay, glass flake, carbon black, graphite, and montmorillonite are preferably used. Among them, mica, talc, and glass flake can be more preferably used.

The average particle size of the granular filler (D) is preferably 0.1 μm or more, more preferably 0.5 μm or more, and still more preferably 1.0 μm or more. The upper limit of the average particle size is preferably not more than 30 μm, more preferably not more than 25 μm, and still more preferably not more than 23 μm. When the average particle size of the granular filler is in this preferred range, a satisfactory surface appearance-improving effect is produced, and deterioration of surface appearance cannot occur.

The term "average particle size" herein refers to an arithmetic average diameter determined by laser diffraction/scattering, which is a mean volume particle size (MV).

The amount of the granular filler (D) is preferably 0.1 parts by weight or more, more preferably 0.5 parts by weight or more, based on 100 parts by weight of the carbon fiber-reinforced thermoplastic resin composition. It is preferably 20 parts by weight or less, more preferably 10 parts by weight or less. When the amount of the granular filler (D) is in this preferred range, a satisfactory surface appearance-improving effect can be produced.

To the carbon fiber-reinforced thermoplastic resin composition, additives such as stabilizers, mold releasing agents, UV absorbers, coloring agents, flame retardants, flame retardant adjuvants, anti-dripping agents, lubricants, fluorescent brightening agents, luminous pigments, fluorescence dyes, flow modifiers, impact strength modifiers, crystal nucleating agents, inorganic and organic antimicrobial agents, photocatalytic stain-proofing agents, infrared absorbers, and photochromic agents; fillers other than spherical fillers; and other thermoplastic resins and thermosetting resins can be added as long as the desired effects are not impaired.

Any stabilizer used as a stabilizer for thermoplastic resins can be used. Specific examples thereof include antioxidants and light stabilizers. By adding such a stabilizer, a carbon fiber-reinforced thermoplastic resin composition and a molded article can be obtained having excellent mechanical properties, moldability, heat resistance, and durability.

Any mold releasing agent used as a mold releasing agent for thermoplastic resins can be used. Specific examples thereof include fatty acids, fatty acid metal salts, oxy fatty acids, fatty acid esters, aliphatic partially saponified esters, paraffin, low-molecular-weight polyolefins, fatty acid amides, alkylene bis-fatty acid amides, aliphatic ketones, and modified silicone. By adding such a mold releasing agent, a molded article can be obtained having excellent mechanical properties, moldability, heat resistance, and durability.

At least one flame retardant selected from bromine-based flame retardants, chlorine-based flame retardants, phosphorus-based flame retardants, nitrogen compound-based flame retardants, silicone-based flame retardants, and other inorganic flame retardants can be used. To provide excellent flame resistance and mechanical properties, it is preferable to use any two or more flame retardants selected from these flame retardants.

Specific examples of bromine-based flame retardants include decabromodiphenyl oxide, octabromodiphenyl oxide, tetrabromodiphenyl oxide, tetrabromophthalic anhydride, hexabromocyclododecane, bis(2,4,6-tribromophenoxy) ethane, ethylenebistetrabromophthalimide, hexabromobenzene, 1,1-sulfonyl[3,5-dibromo-4-(2,3-dibromopropoxy)]benzene, polydibromophenylene oxide, tetrabromobisphenol-S, tris(2,3-dibromopropyl-1) isocyanurate, tribromophenol, tribromophenyl allyl ether, tribromoneopentyl alcohol, brominated polystyrene, brominated polyethylene, tetrabromobisphenol-A, tetrabromobisphenol-A derivatives, tetrabromobisphenol-A-epoxy oligomers or polymers, brominated epoxy resins such as brominated phenol novolac epoxy, tetrabromobisphenol-A-carbonate oligomers or polymers, tetrabromobisphenol-A-bis(2-hydroxydiethyl ether), tetrabromobisphenol-A-bis(2,3-dibromopropyl ether), tetrabromobisphenol-A-bis(allyl ether), tetrabromocyclooctane, ethylenebispentabromodiphenyl, tris(tribromoneopentyl)phosphate, poly(pentabromobenzyl polyacrylate), octabromotrimethylphenyl indan, dibromoneopentyl glycol, pentabromobenzyl polyacrylate, dibromocresyl glycidyl ether, and N,N'-ethylene-bis-tetrabromoterephthalimide.

Specific examples of chlorine-based flame retardants include chlorinated paraffin, chlorinated polyethylene, perchlorocyclo pentadecane, and tetrachlorophthalic anhydride.

Specific examples of phosphorus-based flame retardants that can be used include commonly-used phosphorus-based flame retardants such as organophosphorus compounds such as phosphate esters, condensed phosphate esters, and polyphosphates; and red phosphorus. To provide excellent fluidity, mechanical properties, and flame resistance, at least one of condensed phosphate esters, polyphosphates, and red phosphorus is preferably used, more preferably condensed phosphate esters, and still more preferably aromatic condensed phosphate esters. Examples of aromatic condensed phosphates include resorcinol polyphenyl phosphate and resorcinol poly(di-2,6-xylyl)phosphate.

Examples of nitrogen compound-based flame retardants include aliphatic amine compounds, aromatic amine compounds, nitrogen-containing heterocyclic compounds, cyanide compounds, aliphatic amides, aromatic amides, urea, and thiourea. To provide excellent flame resistance and mechanical properties, nitrogen-containing heterocyclic compounds are preferred, and, in particular, triazine compounds are preferred. Melamine cyanurate or melamine isocyanurate is more preferred, and, in particular, adducts of cyanuric acid or isocyanuric acid with a triazine compound are preferred, the adducts having a composition of, generally, 1:1 (molar ratio) or, optionally, 1:2 (molar ratio). If the nitrogen compound-based flame retardants listed above have poor dispersibility, dispersants such as tris(β-hydroxyethyl) isocyanurate or known surface treatment agents may be used in combination.

Examples of silicone-based flame retardants include silicone resins and silicone oils. The silicone resins include resins having a three-dimensional network structure composed of combined structural units of $RSiO_{3/2}$, $R_2SiO$, and $R_3SiO_{1/2}$, wherein R represents an alkyl group such as methyl, ethyl, or propyl; an aromatic group such as phenyl or benzyl; or the substituents described above containing a vinyl group therein. The silicone oils include polydimethylsiloxane; modified polysiloxanes in which at least one methyl group in the side chain or terminal of polydimethylsiloxane is modified by at least one group selected from hydrogen, alkyl, cyclohexyl, phenyl, benzyl, amino, epoxy, polyether, carboxyl, mercapto, chloroalkyl, alkyl higher alcohol ester, alcohol, aralkyl, vinyl, and trifluoromethyl; and mixtures thereof.

Examples of other inorganic flame retardants include magnesium hydroxide, aluminum hydroxide, antimony trioxide, antimony pentoxide, sodium antimonate, hydroxy zinc stannate, zinc stannate, metastannic acid, tin oxide, tin oxide salts, zinc sulfate, zinc oxide, ferrous oxide, ferric oxide, stannous oxide, stannic oxide, zinc borate, ammonium borate, ammonium octamolybdate, metal salts of tungstic acid, complex oxide acid of tungsten and metalloid, ammonium sulfamate, ammonium bromide, zirconium compounds, guanidine compounds, fluorine compounds, graphite, and swellable graphite. To provide excellent flame resistance and mechanical properties, magnesium hydroxide, fluorine compounds, and swellable graphite are preferred, and fluorine compounds are more preferred. Preferred fluorine compounds are polytetrafluoroethylene, polyhexafluoropropylene, tetrafluoroethylene/hexafluoropropylene copolymer, tetrafluoroethylene/perfluoroalkyl vinyl ether copolymer, tetrafluoroethylene/ethylene copolymer, hexafluoropropylene/propylene copolymer, polyvinylidene fluoride, vinylidene fluoride/ethylene copolymer, and the like, and polytetrafluoroethylene-containing powder mixtures comprising polytetrafluoroethylene particles and an organic polymer are also preferred.

Although the carbon fiber-reinforced thermoplastic resin composition may be produced by any method as long as the requirements as defined herein are met, it is preferably produced by melt-kneading, and when a blend of the thermoplastic resin (A), the carbon fiber (B), and the titanium compound (C) is produced, the temperature of a melt-kneader is preferably set at a temperature at which the thermoplastic resin used melts. The thermoplastic resin (A), the carbon fiber (B), and the titanium compound (C) may be fed at any raw material feeding position in the melt-kneader. Preferably, the thermoplastic resin (A) and the titanium compound (C) are fed through a main raw material feed port. The carbon fiber (B) may be fed at any position, preferably at the midpoint between the main raw material feed port and a discharge port, specifically, at the intermediate position between the sealing zone and/or mixing zone nearest to the main raw material feed port and the sealing zone and/or mixing zone nearest to the discharge port in a screw element design. In this case, it is easy to control the weight average fiber length, which is preferred.

There is no limitation on the melt-kneader that produces the carbon fiber-reinforced thermoplastic resin composition, and a known melt-kneader such as an extruder or a continuous kneader, used for resin processing which is capable of melt-mixing the thermoplastic resin (A), the carbon fiber (B), and the titanium compound (C) by heating in the presence of a moderate shear field can be used. Non-limiting examples thereof include single-screw extruders/kneaders equipped with one screw, twin-screw extruders/kneaders equipped with two screws, multi-screw extruders/kneaders equipped with three or more screws, further, extruders equipped with one extruder/kneader, tandem type extruders in which two extruders/kneaders are connected, and extruders/kneaders provided with a side feeder not configured to perform melt-kneading and configured only to feed raw material. For the screw element design, any combination of a melt- or non-melt-conveying zone having a full-flight screw and the like, a sealing zone having a seal ring and the like, and a mixing zone having a unimelt, a kneading and the like may be used. For example, continuous melt-kneaders that have two or more sealing zones and/or mixing zones and have two or more raw material feed ports are preferred; continuous melt-kneaders that have two or more sealing zones and/or mixing zones and have a twin-screw unit provided with two or more raw material feed ports are still more preferred; and twin-screw extruders that have two or more sealing zones and/or mixing zones and have two or more raw material feed ports are most preferred.

For a pellet produced by molding the carbon fiber-reinforced thermoplastic resin composition by the method described above, the carbon fiber in the pellet preferably has a weight average fiber length of 0.01 to 2 mm, more preferably 0.05 mm or more, and still more preferably 0.1 mm or more. It is more preferably 1 mm or less, still more preferably 0.5 mm or less. When the weight average fiber length of the carbon fiber in the pellet is in this preferred range, sufficient impact strength and flexural modulus are exhibited, and excellent surface appearance can be provided.

The weight average fiber length of the carbon fiber in the pellet is determined such that the pellets obtained are fired at 500° C. for 1 hour; the resulting ash is dispersed in water; the dispersion is filtered; the residue is observed under a light microscope; and the length of 1,000 fibers is measured to calculate the weight average fiber length. Specifically, about 10 g of pellets of the carbon fiber-reinforced resin composition are placed in a crucible, baked in the covered crucible on an electric stove until flammable gas stops evolving, and then fired in an electric furnace set at 500° C. for another 1 hour to obtain only a carbon fiber residue. An image of the residue magnified 50 to 100 times with a light microscope is observed, and the length of randomly selected 1,000 fibers is measured. Using the measurements (mm) (two significant figures after the decimal point), the weight average fiber length is calculated based on Equation (1) or (2):

$$\text{Weight average fiber length } (L_w) = \Sigma(W_i \times L_i)/\Sigma W_i = \Sigma(\pi \times r_i^2 \times L_i \times \rho \times n_i \times L_i)/\Sigma(\pi \times r_i^2 \times L_i \times \rho \times n_i) \quad (1).$$

$L_i$, $n_i$, $W_i$, $r_i$, $\rho$, and $\pi$ are as described below. The cross-sectional shape of a carbon fiber is approximated to a perfect circle with a fiber diameter $r_i$.

($L_i$: fiber length of carbon fiber, $n_i$: the number of carbon fibers with a fiber length of $L_i$, $W_i$: weight of carbon fibers with a fiber length of $L_i$, $r_i$: fiber diameter of carbon fibers with a fiber length of $L_i$, $\rho$: density of carbon fiber, and $\pi$: the ratio of the circumference of a circle to its diameter)

When the fiber diameter $r_i$ and the density $\rho$ are constant, the Equation (1) above is approximated as described below, and the weight average fiber length can be determined by Equation (2):

$$\text{Weight average fiber length } (L_w) = \Sigma(L_i^2 \times n_i)/\Sigma(L_i \times n_i) \quad (2).$$

From the carbon fiber-reinforced thermoplastic resin composition, various articles can be produced by molding the pellets produced typically as described above. Examples of methods of molding the carbon fiber-reinforced thermoplastic resin composition include injection molding, extrusion molding, press molding, vacuum molding, and blow molding, and injection molding is preferred.

In the injection molding, according to the intended use, not only the conventional molding method but also injection molding methods such as injection compression molding, injection press molding, gas-assisted injection molding, foam molding (including molding by injection of supercritical fluid), insert molding, in-mold coating molding, insulated runner molding, quick heating and cooling molding, two-color molding, sandwich molding, and ultra-high-speed injection molding can be used to produce a molded article. The advantages of these molding methods are already widely known. For the molding, both a cold-runner system and a hot-runner system may be selected.

Also from the carbon fiber-reinforced thermoplastic resin composition, molded articles can be produced by extrusion molding in the form of various profile extrusion-molded articles, sheets, films, and the like. For forming sheets and films, the inflation method, calendering method, casting method, and the like can also be used. The carbon fiber-reinforced thermoplastic resin composition can also be molded into a heat-shrinkable tube by additionally carrying out a specific stretching operation. The carbon fiber-reinforced thermoplastic resin composition can also be molded into a hollow molded article using rotational molding, blow molding, or the like.

The weight average fiber length of the carbon fiber (B) in a molded article from the carbon fiber-reinforced thermoplastic resin composition is not critical, and it is preferably 0.01 to 0.5 mm, more preferably 0.125 mm or more, and still more preferably 0.15 mm or more. It is more preferably 0.45 mm or less, still more preferably 0.40 mm or less. When the weight average fiber length of the carbon fiber is in this preferred range, impact strength and flexural modulus are sufficiently improved, and deterioration of surface appearance cannot occur. The weight average fiber length is determined such that the molded article obtained is fired at 500° C. for 1 hour; the resulting ash is dispersed in water; the dispersion is filtered; the residue is observed under a light microscope; and the length of 1,000 fibers is measured to calculate the weight average fiber length.

For the molded article produced by molding the carbon fiber-reinforced thermoplastic resin composition, the arithmetic mean height ($W_a$) value of an undulating curve on the molded article surface is preferably 3.0 µm or less, more preferably 2.5 µm or less, and still more preferably 2.0 µm or less. The lower limit of the arithmetic mean height ($W_a$) value of an undulating curve is 0 µm at lowest and is not critical. When the arithmetic mean height ($W_a$) value of an undulating curve is in this preferred range, undulating irregularities are not visually conspicuous on the surface of the carbon fiber-reinforced thermoplastic resin composition, and the appearance/designability of the molded article can be maintained at a satisfactory level. The arithmetic mean height ($W_a$) value of an undulating curve, as defined in JIS B 0601, is an arithmetic mean height ($W_a$) of an undulating curve obtained such that using a square plate-like molded article of 80 mm×80 mm×3 mm produced by injection molding, the surface of the molded article is measured with a surface roughness measuring instrument (manufactured by TOKYO SEIMITSU CO., LTD.) over an assessment length of 20 mm at a test speed of 0.6 mm/sec.

The molded articles described above can be used in various applications such as automotive parts, electric and electronic parts, building components, sports equipment parts, various containers, daily necessities, everyday sundries, and sanitary goods. Specific examples of applications include underhood parts for automobiles such as air flow meters, air pumps, thermostat housings, engine mounts, ignition bobbins, ignition cases, clutch bobbins, sensor housings, idle speed control valves, vacuum switching valves, ECU housings, vacuum pump cases, inhibitor switches, rotation sensors, acceleration sensors, distributor caps, coil bases, ABS actuator cases, the top and the bottom of radiator tanks, cooling fans, fan shrouds, engine covers, cylinder head covers, oil caps, oil pans, oil filters, fuel caps, fuel strainers, distributor caps, vapor canister housings, air cleaner housings, timing belt covers, brake booster parts, various cases, various tubes, various tanks, various hoses, various clips, various valves, and various pipes; interior parts for automobiles such as torque control levers, safety belt parts, register blades, washer levers, window regulator handles, knobs for window regulator handles, passing light levers, sun visor brackets, and various motor housings; exterior parts for automobiles such as roof rails, fenders, garnishes, bumpers, door mirror stays, spoilers, hood louvers, wheel covers, wheel caps, grill apron cover frames, lamp reflectors, lamp bezels, and door handles; and electrical and electronic components such as relay cases, coil bobbins, optical pickup chassis, motor cases, housings, chassis, and internal parts for notebook computers, housings and internal parts for CRT displays, housings and internal parts for printers, housings, chassis, and internal parts for mobile terminals including mobile phones, mobile computers, and handheld-type mobiles, housings, chassis, and internal parts for recording media (e.g., CD, DVD, PD, and FDD) drives, housings, chassis, and internal parts for copiers, housings, chassis, and internal parts for facsimile devices, and parabolic antennas. Further examples of applications include parts for home and office electric appliances such as VTR parts, television parts, irons, hair dryers, rice cooker parts, microwave oven parts, acoustic parts, parts for video equipment including video cameras and projectors, substrates for optical recording media including Laser Disc (registered trademark), compact disc (CD), CD-ROM, CD-R, CD-RW, DVD-ROM, DVD-R, DVD-RW, DVD-RAM, and Blu-ray disc, parts and housings for illumination, chassis parts, refrigerator parts, air conditioner parts, typewriter parts, and word processor parts. The molded articles described above are also useful for housings, chassis, and internal parts for electronic musical instruments, home game consoles, and portable game consoles; electrical and electronic components such as various gears, various cases, sensors, LEP lamps, connectors, sockets, resistors, relay cases, switches, coil bobbins, capacitors, variable capacitor cases, optical pickups, radiators, various terminal blocks, transformers, plugs, printed circuit boards, tuners, speakers, microphones, headphones, small motors, magnetic head bases, power modules, semiconductors, liquid crystals, FDD carriages, FDD chassis, motor brush holders, transformer members, and coil bobbins; building components such as sash rollers, blind curtain parts, pipe joints, curtain liners, blind parts, gas meter parts, water meter parts, water heater parts, roof panels, adiabatic walls, adjusters, plastic floor posts, ceiling hangers, stairs, doors, and floors; civil engineering-related members such as concrete molds; sports equipment parts such as fishing rod parts, housings, spools, and body parts for reels, lure parts, cooler box parts, golf club parts, racket parts for tennis, badminton, and squash, ski parts, ski pole parts, bicycles parts such as frames, pedals, front forks, handlebars, brake brackets, cranks, sheet pillars, wheels, and dedicated shoes, oars for boats, helmets for sports, fence components, golf tees, and face protectors and bamboo swords for Kendo (Japanese art of fencing); machine parts such as gears, screws, springs, bearings, levers, key stems, cams, ratchets, rollers, water-supply parts, toy parts, banding bands, clips, fans, pipes, washing jigs, motor parts, microscopes, binoculars, cameras, and watches; agricultural members such as pots for raising seedlings, vegetation piles, and stoppers for agricultural vinyl sheets; medical supplies such as fracture reinforcing materials; vessels and tableware such as trays, blisters, knives, forks, spoons, tubes, plastic cans, pouches, containers, tanks, and baskets; containers such as hot-fill containers, containers for microwave oven cooking, and containers for cosmetics; IC trays; stationery; drain filters; bags; chairs; tables; cooler boxes; rakes; hose reels; planters; hose nozzles; surfaces of dining tables and desks; furniture panels; kitchen cabinets; pen caps; and gas lighters. In particular, they are useful for interior parts for automobiles, exterior parts for automobiles, sports equipment parts, and housings, chassis, and internal parts for various electric and electronic parts.

The carbon fiber-reinforced thermoplastic resin composition and molded article thereof are recyclable. For example, an injection-molded article from the carbon fiber-reinforced thermoplastic resin is pulverized preferably into powder, and then it can be used, if necessary, with the addition of additives. However, if fiber breakage has occurred, it is difficult for the resulting resin composition to exhibit a mechanical strength comparable to that of the molded article.

EXAMPLES

Our compositions, pellets, moldings and methods will now be described in more detail with reference to Examples and Comparative Examples, but this disclosure is not limited to these Examples.

The raw materials used were as follows:
(A) Thermoplastic Resin
- (A-1) Nylon 9T resin "Genestar" (registered trademark) N1001D (available from Kuraray Co., Ltd.) (melting point: 262° C.). Using a differential scanning calorimeter (Robot DSC, EXSTAR6000 System manufactured by Seiko Instruments Inc.), the supercooling temperature difference (Tm–Tc) was measured at a heating/cooling rate of 20° C./min to be 38° C.
- (A-2) Nylon 6 resin "amilan" (registered trademark) CM1001 (available from Toray Industries, Inc.). The supercooling temperature difference (Tm–Tc) was measured in the same manner as in (A-1) to be 53° C.
- (A-3) Nylon MXD6 resin "Reny" (registered trademark) #6002 (available from Mitsubishi Engineering-Plastics Corporation). The supercooling temperature difference (Tm–Tc) was measured in the same manner as in (A-1) to be 77° C.
- (A-4) Aromatic polycarbonate resin "TARFLON" (registered trademark) A1900 (available from Idemitsu Kosan Co., Ltd., viscosity average molecular weight: 19,000)
  - (a) Aromatic Group-Containing Crystalline Polyamide Resin
  - (a-1) Nylon 9T resin "Genestar" (registered trademark) N1001D (available from Kuraray Co., Ltd.) (melting point: 262° C.). Using a differential scanning calorimeter (Robot DSC, EXSTAR6000 System manufactured by Seiko Instruments Inc.), the supercooling temperature difference (Tm–Tc) was measured at a heating/cooling rate of 20° C./min to be 38° C.
  - (a') Crystalline Polyamide Resin Not Containing Aromatic Group
  - (a'-1) Nylon 6 resin "amilan" (registered trademark) CM1001 (available from Toray Industries, Inc.). The supercooling temperature difference (Tm–Tc) was measured in the same manner as in (A-1) to be 53° C.
  - (b) Amorphous Polyamide Resin
  - (b-1) Nylon 6T/6I copolymer (available from EMS-CHEMIE (Japan) Ltd.: "GRIVORY" (registered trademark) (R) G21, glass transition temperature: 125° C., No melting peak)
  - (b-2) Trimethylhexamethylenediamine/terephthalic acid copolymer (available from Daicel-Evonik Ltd., "TROGAMID" (registered trademark) T5000, glass transition temperature: 153° C.)
  - (b-3) Nylon 12/MACMI copolymer (available from EMS-CHEMIE (Japan) Ltd., "Grilamid" (registered trademark) TR55, glass transition temperature: 162° C., No melting peak)
  - (b') Amorphous Resin Other Than Amorphous Polyamide Resin
  - (b'-1) Acrylonitrile styrene resin: A monomer mixture comprising 70 wt % of styrene and 30 wt % of acrylonitrile was suspension-polymerized to prepare a styrene resin. The styrene resin obtained was dried under reduced pressure at 70° C. for 5 hours, and then adjusted to 0.4 g/100 ml (methyl ethyl ketone, 30° C.). The limiting viscosity measured with an Ubbelohde viscometer was 0.53 dl/g.

(B) Carbon Fiber
- (B-1) Carbon fiber "TORAYCA" (registered trademark) cut fiber TV14-006 (available from Toray Industries, Inc., original yarn T700SC-12K, tensile strength: 4.90 GPa, tensile modulus: 230 GPa) was used.
- (B-2) To carbon fiber "TORAYCA" (registered trademark) original yarn T800SC-24K (available from Toray Industries, Inc., tensile strength: 5.88 GPa, tensile modulus: 294 GPa), a urethane resin emulsion: SUPERFLEX 300 (available from Dai-ichi Kogyo Seiyaku Co., Ltd.) was applied such that the amount of the resin component adhered was 3.0% by weight, and water was removed by drying in a drying furnace at 200° C. Thereafter, the carbon fiber was cut with a rotary cutter to a fiber length of 6.0 mm, and the resulting cut fiber was used.
- (B-3) Carbon fiber "TORAYCA" (registered trademark) cut fiber TS15-006 (available from Toray Industries, Inc., original yarn S300C-48K, tensile strength: 3.43 GPa, tensile modulus: 230 GPa) was used.

(C) Titanium Compound
- (C-1) Chloride process titanium oxide (rutile type) CR-63, (available from ISHIHARA SANGYO KAISHA, LTD., average particle size: 0.21 μm)

(D) Granular Filler
- (D-1) Mica: A-11 (available from YAMAGUCHI MICA CO., LTD., average particle size: 3 μm)

Examples 1 to 9, Comparative Examples 1 to 7

For the compositions shown in Table 1, using a twin-screw extruder TEX30α manufactured by The Japan Steel Works, Ltd. set to various conditions shown in the table, a thermoplastic resin (A) and a titanium compound (C) was fed to a main feeder, and then a carbon fiber (B) was fed into the molten resin using a side feeder. A strand discharged through a die was cooled in water, and pelletized by cutting it with a strand cutter to a length of 3.0 mm to obtain a carbon fiber-reinforced thermoplastic resin composition pellet.

The carbon fiber-reinforced thermoplastic resin composition pellet obtained above was vacuum-dried at 80° C. for twenty-four hours, and using an injection molding machine SG75H-DUZ manufactured by Sumitomo Heavy Industries, Ltd. under the conditions in the table, test pieces were formed at an injection rate of 100 mm/sec and an injection pressure of the lower limit of pressure (the lowest charging pressure)+5 MPa, and their physical properties were measured under the following conditions.

Fiber Length
From the pellet and the tensile test piece, 10 g of a sample was cut out, burned in an electric furnace set at 500° C. for 1 hour, and then dispersed in ion exchanged water. The dispersion was filtered, and the residue was observed under a light microscope at 20- to 100-fold magnification, while the length of 1,000 fibers was measured to determine the weight average fiber length (mm) of the pellet and the molded article.

Shock Resistance
Charpy impact strength (notched) was determined at 23° C. in accordance with ISO179.

Tensile Strength
Tensile strength was determined at 23° C. in accordance with ISO527.

Flexural Modulus
Flexural modulus was determined at 23° C. in accordance with ISO178.

Surface Roughness
Using a square plate of 80 mm×80 mm×3 mm obtained by injection molding, the arithmetic average roughness (Ra) value of the molded article surface was determined with a surface roughness measuring instrument manufactured by TOKYO SEIMITSU CO., LTD. under the measurement conditions of an assessment length of 8 mm and a test speed of 0.6 mm/sec.

Surface Undulation

Using a square plate of 80 mm×80 mm×3 mm obtained by injection molding, the arithmetic mean height (Wa) value of an undulating curve of the molded article surface was determined with a surface roughness measuring instrument manufactured by TOKYO SEIMITSU CO., LTD. under the measurement conditions of an assessment length of 20 mm and a test speed of 0.6 mm/sec.

Low Water Absorbability

A dumbbell test piece prepared by injection molding was subjected to water absorption treatment at 60° C. and a relative humidity of 95% for 500 hours, and the test piece after the treatment was subjected to a flexural test to measure its flexural modulus and flexural strength.

TABLE 1

| | | | Example 1 | Example 2 | Example 3 | Example 4 | Comparative Example 1 | Comparative Example 2 | Example 5 |
|---|---|---|---|---|---|---|---|---|---|
| Composition | (A) Thermoplastic resin | Type | A-1 | A-1 | A-1 | A-1 | A-1 | A-1 | A-1 |
| | | Parts by weight | 55 | 55 | 55 | 55 | 55 | 70 | 65 |
| | (B) Carbon fiber | Type | B-1 | B-2 | B-3 | B-2 | B-3 | B-2 | B-2 |
| | | Parts by weight | 45 | 45 | 45 | 45 | 45 | 30 | 35 |
| | (C) Titanium compound | Type | C-1 | C-1 | C-1 | C-1 | | C-1 | C-1 |
| | | Parts by weight | 0.5 | 0.5 | 0.5 | 2 | | 0.5 | 0.5 |
| Extruding | (C) Amount of Titanium compound (based on carbon fiber) | wt % | 1.11 | 1.11 | 1.11 | 4.44 | 0 | 1.67 | 1.43 |
| | Setting temperature | °C. | 300 | 300 | 300 | 300 | 300 | 300 | 300 |
| Molding | Molding temperature | °C. | 300 | 300 | 300 | 300 | 300 | 300 | 300 |
| | Mold temperature | °C. | 140 | 140 | 140 | 140 | 140 | 140 | 140 |
| Properties | Fiber length of pellet | mm | 0.21 | 0.21 | 0.21 | 0.20 | 0.21 | 0.28 | 0.24 |
| | Fiber length of molded article | mm | 0.20 | 0.20 | 0.20 | 0.18 | 0.20 | 0.27 | 0.22 |
| | Charpy impact strength | kJ/m$^2$ | 9 | 12 | 9 | 10 | 9 | 8 | 9 |
| | Flexural modulus | GPa | 27 | 32 | 26 | 30 | 26 | 21 | 26 |
| | Tensile strength | MPa | 230 | 260 | 220 | 250 | 220 | 250 | 220 |
| | Surface roughness (Ra) | μm | 0.3 | 0.4 | 0.4 | 0.4 | 0.6 | 0.3 | 0.3 |
| | Surface undulation (Wa) | μm | 2.1 | 2.4 | 2.5 | 2.4 | 3.5 | 1.8 | 2.0 |

| | | | Comparative Example 3 | Example 6 | Comparative Example 4 | Example 7 | Comparative Example 5 |
|---|---|---|---|---|---|---|---|
| Composition | (A) Thermoplastic resin | Type | A-1 | A-2 | A-2 | A-3 | A-3 |
| | | Parts by weight | 65 | 55 | 55 | 55 | 55 |
| | (B) Carbon fiber | Type | B-3 | B-2 | B-2 | B-2 | B-2 |
| | | Parts by weight | 35 | 45 | 45 | 45 | 45 |
| | (C) Titanium compound | Type | | C-1 | | C-1 | |
| | | Parts by weight | | 0.5 | | 0.5 | |
| Extruding | (C) Amount of Titanium compound (based on carbon fiber) | wt % | 0 | 1.11 | 0 | 1.11 | 0 |
| | Setting temperature | °C. | 300 | 260 | 260 | 280 | 280 |
| Molding | Molding temperature | °C. | 300 | 270 | 270 | 280 | 280 |
| | Mold temperature | °C. | 140 | 80 | 80 | 140 | 140 |
| Properties | Fiber length of pellet | mm | 0.24 | 0.23 | 0.23 | 0.18 | 0.18 |
| | Fiber length of molded article | mm | 0.22 | 0.22 | 0.22 | 0.16 | 0.16 |
| | Charpy impact strength | kJ/m$^2$ | 9 | 10 | 11 | 12 | 11 |
| | Flexural modulus | GPa | 26 | 28 | 29 | 40 | 40 |
| | Tensile strength | MPa | 230 | 230 | 230 | 290 | 280 |
| | Surface roughness (Ra) | μm | 0.5 | 0.3 | 0.3 | 0.2 | 0.4 |
| | Surface undulation (Wa) | μm | 2.7 | 4.2 | 5.8 | 4.0 | 6.4 |

Examples 10 to 18, Comparative Example 8

For the compositions shown in Table 1, carbon fiber-reinforced thermoplastic resin composition pellets were prepared in the same manner as in Example 1, and injection molding and determination of physical properties were performed.

TABLE 2

|  |  |  |  | Example 10 | Example 11 | Example 12 | Example 13 | Example 14 |
|---|---|---|---|---|---|---|---|---|
| Com-position | (A) Thermoplastic resin | (a) Aromatic group-containing crystalline polyamide resin | Type<br>Parts by weight | a-1<br>55 | a-1<br>50 | a-1<br>40 | a-1<br>40 | a-1<br>40 |
|  |  | (a') Crystalline polyamide resin not containing aromatic group | Type<br>Parts by weight |  |  |  |  |  |
|  |  | (b) Amorphous polyamide resin | Type<br>Parts by weight |  | b-1<br>3 | b-1<br>15 | b-2<br>15 | b-3<br>15 |
|  |  | (b') Amorphous resin other than amorphous polyamide resin | Type<br>Parts by weight |  |  |  |  |  |
|  | (B) Carbon fiber |  | Type<br>Parts by weight | B-2<br>45 | B-2<br>45 | B-2<br>45 | B-2<br>45 | B-2<br>45 |
|  | (C) Titanium compound |  | Type<br>Parts by weight | C-1<br>1 | C-1<br>1 | C-1<br>1 | C-1<br>1 | C-1<br>1 |
|  | (D) Granular filler |  | Type<br>Parts by weight |  |  |  |  |  |
| Extruding | (C) Amount of Titanium compound (based on carbon fiber) |  | wt % | 2.22 | 2.22 | 2.22 | 2.22 | 2.22 |
|  | Setting temperature |  | ° C. | 300 | 300 | 300 | 300 | 300 |
| Molding | Molding temperature |  | ° C. | 300 | 300 | 300 | 300 | 300 |
|  | Mold temperature |  | ° C. | 140 | 140 | 140 | 140 | 140 |
| Properties | Fiber length of pellet |  | mm | 0.20 | 0.20 | 0.20 | 0.20 | 0.20 |
|  | Fiber length of molded article |  | mm | 0.18 | 0.18 | 0.18 | 0.18 | 0.18 |
|  | Charpy impact strength |  | kJ/m$^2$ | 9 | 10 | 11 | 9 | 8 |
|  | Flexural modulus |  | GPa | 32 | 32 | 32 | 31 | 31 |
|  | Tensile strength |  | MPa | 240 | 240 | 240 | 240 | 240 |
|  | Surface roughness (Ra) |  | μm | 0.4 | 0.4 | 0.4 | 0.5 | 0.7 |
|  | Surface undulation (Wa) |  | μm | 2.3 | 2.2 | 1.7 | 2.2 | 2.2 |
|  | Decreasing rate of modulus after water absorption |  | % | 15 | 10 | 15 | 20 | 20 |
|  | Decreasing rate of strength after water absorption |  | % | 15 | 15 | 15 | 20 | 20 |

|  |  |  |  | Example 15 | Example 16 | Example 17 | Example 18 | Comparative Example 8 |
|---|---|---|---|---|---|---|---|---|
| Com-position | (A) Thermoplastic resin | (a) Aromatic group-containing crystalline polyamide resin | Type<br>Parts by weight | a-1<br>43 | a-1<br>55 | a-1<br>40 |  |  |
|  |  | (a') Crystalline polyamide resin not containing aromatic group | Type<br>Parts by weight |  |  |  | a'-1<br>40 | a'-1<br>55 |
|  |  | (b) Amorphous polyamide resin | Type<br>Parts by weight |  |  | b-1<br>15 | b-1<br>15 |  |
|  |  | (b') Amorphous resin other than amorphous polyamide resin | Type<br>Parts by weight | b'-1<br>10 |  |  |  |  |
|  | (B) Carbon fiber |  | Type<br>Parts by weight | B-2<br>45 | B-2<br>45 | B-2<br>45 | B-2<br>45 | B-2<br>45 |
|  | (C) Titanium compound |  | Type<br>Parts by weight | C-1<br>1 | C-1<br>1 | C-1<br>1 | C-1<br>1 |  |
|  | (D) Granular filler |  | Type<br>Parts by weight |  | D-1<br>5 | D-1<br>5 |  |  |
| Extruding | (C) Amount of Titanium compound (based on carbon fiber) |  | wt % | 2.22 | 2.22 | 2.22 | 2.22 | 0.00 |
|  | Setting temperature |  | ° C. | 300 | 300 | 300 | 260 | 260 |
| Molding | Molding temperature |  | ° C. | 300 | 300 | 300 | 270 | 270 |
|  | Mold temperature |  | ° C. | 110 | 140 | 140 | 80 | 80 |
| Properties | Fiber length of pellet |  | mm | 0.20 | 0.20 | 0.21 | 0.22 | 0.23 |
|  | Fiber length of molded article |  | mm | 0.18 | 0.18 | 0.20 | 0.21 | 0.22 |
|  | Charpy impact strength |  | kJ/m$^2$ | 8 | 8 | 9 | 10 | 11 |
|  | Flexural modulus |  | GPa | 31 | 33 | 32 | 28 | 29 |
|  | Tensile strength |  | MPa | 230 | 260 | 250 | 260 | 230 |
|  | Surface roughness (Ra) |  | μm | 0.9 | 0.8 | 0.6 | 0.3 | 0.3 |
|  | Surface undulation (Wa) |  | μm | 2.5 | 2.2 | 1.2 | 3.8 | 5.8 |
|  | Decreasing rate of modulus after water absorption |  | % | 10 | 10 | 10 | 45 | 45 |
|  | Decreasing rate of strength after water absorption |  | % | 15 | 10 | 10 | 55 | 55 |

As shown in Examples 1 to 18, molded articles produced by molding a resin composition comprising the thermoplastic resin (A), the carbon fiber (B), and the titanium compound (C) have excellent mechanical properties, reduced surface roughness and surface undulation which are indices of appearance properties, and mechanical properties and appearance/designability comparable to those of metals. In contrast, for molded articles of Comparative Examples 1 to 8 which do not contain the titanium compound (C), either of mechanical properties or appearance/designability is poor.

Molded articles produced by molding the resin composition shown in Examples 11 to 14, comprising an aromatic group-containing crystalline polyamide resin (a) and an amorphous polyamide resin (b), have the most excellent balance between surface appearance and mechanical properties as well as excellent low water absorbability.

INDUSTRIAL APPLICABILITY

The carbon fiber-reinforced thermoplastic resin composition has not only a very high tensile strength and flexural modulus but also excellent surface appearance (undulating irregularity) and, therefore, can be suitably used in various applications requiring appearance/designability in addition to mechanical properties such as automotive parts, electric and electronic parts, building components, and sports equipment parts.

The invention claimed is:

1. A carbon fiber-reinforced thermoplastic resin composition, comprising:
   a thermoplastic resin (A);
   a carbon fiber (B); and
   a titanium compound (C),
   an amount of the thermoplastic resin (A) being 10 to 65% by weight, an amount of the carbon fiber (B) being 35 to 90% by weight, based on 100% by weight of the total amount of the thermoplastic resin (A) and the carbon fiber (B), and an amount of the titanium compound (C) being 1) 0.01 to 5 parts by weight, based on 100 parts by weight of the total amount of the thermoplastic resin (A) and the carbon fiber (B), and 2) 0.1 to 1.5% by weight of the amount of the carbon fiber (B).

2. The carbon fiber-reinforced thermoplastic resin composition according to claim 1, wherein the titanium compound (C) is titanium oxide.

3. The carbon fiber-reinforced thermoplastic resin composition according to claim 1, wherein the thermoplastic resin (A) is at least one selected from the group consisting of a polyamide resin, a polycarbonate resin, and a polyester resin.

4. The carbon fiber-reinforced thermoplastic resin composition according to claim 3, wherein the thermoplastic resin (A) is a polyamide resin.

5. The carbon fiber-reinforced thermoplastic resin composition according to claim 4, wherein the polyamide resin has a melting point (Tm) of 250 to 350° C., as determined by thermal analysis using a differential scanning calorimeter (DSC).

6. The carbon fiber-reinforced thermoplastic resin composition according to claim 4, wherein the polyamide resin has a difference between a melting point (Tm) and a crystallization temperature at descending temperature (Tc) of 0° C. to 50° C., wherein Tm and Tc are determined by thermal analysis using a differential scanning calorimeter (DSC).

7. The carbon fiber-reinforced thermoplastic resin composition according to claim 4, wherein the polyamide resin is at least one selected from the group consisting of polyamide 6, polyamide 66, polyamide MXD6, polyamide 9T, polyamide 10T, and copolyamides thereof.

8. The carbon fiber-reinforced thermoplastic resin composition according to claim 4, wherein the polyamide resin comprises an aromatic group-containing crystalline polyamide resin (a) and an amorphous polyamide resin (b), the amount of the aromatic group-containing crystalline polyamide resin (a) being 1 to 99% by weight, the amount of the amorphous polyamide resin (b) being 99 to 1% by weight, based on 100% by weight of the total amount of (a) and (b).

9. The carbon fiber-reinforced thermoplastic resin composition according to claim 8, wherein the aromatic group-containing crystalline polyamide resin (a) has a melting point (Tm) of 250 to 350° C., as determined by thermal analysis using a differential scanning calorimeter (DSC).

10. The carbon fiber-reinforced thermoplastic resin composition according to claim 8, wherein the aromatic group-containing crystalline polyamide resin (a) has a difference between a melting point (Tm) and a crystallization temperature at descending temperature (Tc) of 0° C. to 50° C., wherein Tm and Tc are determined by thermal analysis using a differential scanning calorimeter (DSC).

11. The carbon fiber-reinforced thermoplastic resin composition according to claim 8, wherein the aromatic group-containing crystalline polyamide resin (a) is at least one selected from the group consisting of polyamide 9T, polyamide 10T, polyamide 6T/66, polyamide 12T, 10T/1012, and polyamide 6T.

12. The carbon fiber-reinforced thermoplastic resin composition according to claim 1, further comprising 0.1 to 20 parts by weight of a granular filler (D), based on 100 parts by weight of the total of the thermoplastic resin (A) and the carbon fiber (B).

13. A pellet produced by molding the carbon fiber-reinforced thermoplastic resin composition according to claim 1, wherein the carbon fiber in the pellet has a weight average fiber length of 0.01 to 2 mm.

14. A molded article produced by molding the pellet according to claim 13.

15. The molded article according to claim 14, wherein the carbon fiber in the molded article has a weight average fiber length of 0.01 to 0.5 mm.

16. The molded article according to claim 14, having a flexural modulus of 20 GPa or more, and an arithmetic mean height (Wa) value of an undulating curve of 3.0 μm or less.

* * * * *